Oct. 26, 1937.                J. B. KOHUT                2,096,989
                                 VALVE
                         Filed March 23, 1937
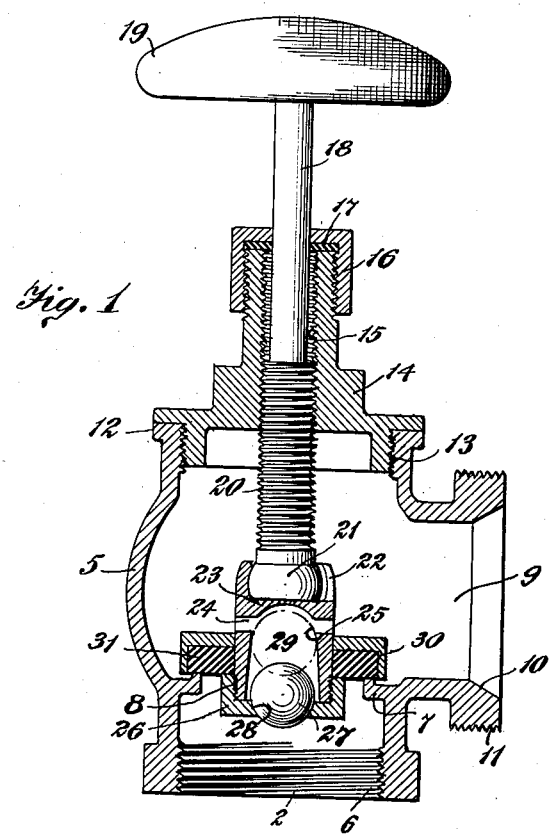
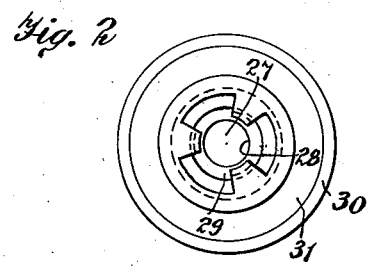
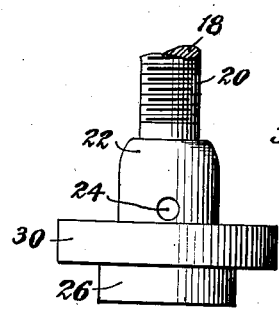
INVENTOR.
JULIUS B. KOHUT
BY
ATTORNEY.

Patented Oct. 26, 1937

2,096,989

UNITED STATES PATENT OFFICE 2,096,989

VALVE

Julius B. Kohut, Brooklyn, N. Y.

Application March 23, 1937, Serial No. 132,473

1 Claim. (Cl. 277—30)

This invention relates to valves as used on piping systems to control the passage therethrough, and more particularly to pipes used in connection with steam and hot water radiators.

In such valves it is often desirable to close the valve, preventing the inlet of steam to the radiator but permit the return of condensed steam to the boiler.

The object of this invention is to provide a valve which effectively fulfills the foregoing requirements. A further feature is in the provision of an inexpensive angle valve particularly adapted for radiator installations, easily operated and capable of long continued service.

These and other advantageous objects, as will later become apparent, are accomplished by the novel construction and arrangement of parts hereinafter described and shown in the accompanying drawing, forming a material part of this disclosure, and in which:—

Figure 1 is a longitudinal sectional view of a valve made in accordance with the invention.

Figure 2 is a bottom plan view of the valve plug and associated parts.

Figure 3 is a side elevational view of the valve plug.

Referring more in detail to the drawing, the valve body, designated generally by the numeral 5, is of conventional type, having at one end an internally threaded inlet 6 to receive a pipe in communication with a steam supply source, the entrance of the pipe being limited by an inreaching annular flange 7 having on its upper side a raised valve seat 8.

Midway in the length of the body 5 is a lateral outlet 9, bevelled interiorly at its outer end and provided with threads 11 on its exterior to engage a union fitting by which the valve may be attached to a radiator.

At the end 12, opposite the inlet, is a similar thread 13 by which is rigidly engaged a bonnet 14 having an internal thread 15 and provided with a cap 16 carrying packing 17.

A valve stem 18 passes through the cap and outer portion of the bonnet, the stem being provided with a handle 19 on its extending end and a screw thread 20 on its inner portion, the thread fitting that of the bonnet 14, the stem terminating in a flattened sphere 21.

A valve plug 22 is formed with a seat 23 to receive the sphere 21, permitting it to rotate therein as the plug is raised and lowered by manipulation of the handle.

Below the spherical seat 23 is an open transverse passage 24, intersecting a chamber having a semi-spherical seat 25 in the plug, which is provided at its inner end with a threaded cap 26 to constitute a housing for a free floating ball 27 adapted, when under pressure, to engage the seat 25 and close the passage 24.

Normally the ball 27, preferably made of glass, rests freely on the edge of an opening 28 in the plug cap 26, this opening having a series of radial slots 29, of undercut angular cross section, to permit water to flow past the ball when on its seat in the opening.

Rigid on the exterior of the plug 22 is an inverted cup 30 to receive a semi-ductile disc 31 adapted to contact the valve seat 8, thereby controlling the main passage through the valve by reason of the handle 19.

In operation, the valve being closed, as shown in Figure 1, the water, formed by condensation of steam in the radiator, enters the valve body at the outlet 9, thence through the passage 24 into the chamber in the valve plug, past the ball 27, by means of the slots 29, then into the inlet pipe by gravity.

When the valve is open, the returning water passes through the valve in the usual manner.

Having described the invention and set forth the manner of its construction and operation, what is claimed as new and sought to secure by Letters Patent, is:

A valve comprising a chambered body having an axial inlet and lateral outlet, a flange in said inlet to prevent excessive entrance of a pipe, a valve seat in said inlet on the upper side of said flange, a chambered valve plug, an inverted cup on said plug having a lining to control the passage through said seat, means to actuate said plug, a transverse opening in said plug forming communication between the chamber therein and the lateral outlet, a non-corrodible floating ball in the chamber adapted to close the transverse opening, when the valve is under pressure, a cap to retain said ball in the chamber, and a series of passages in said ball retaining means communicating with said axial inlet.

JULIUS B. KOHUT.